2,971,941

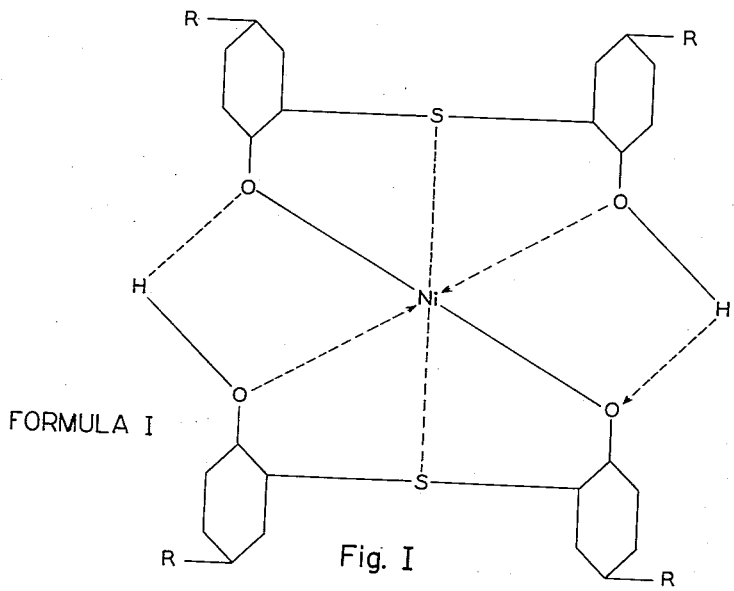
FORMULA I
Fig. I
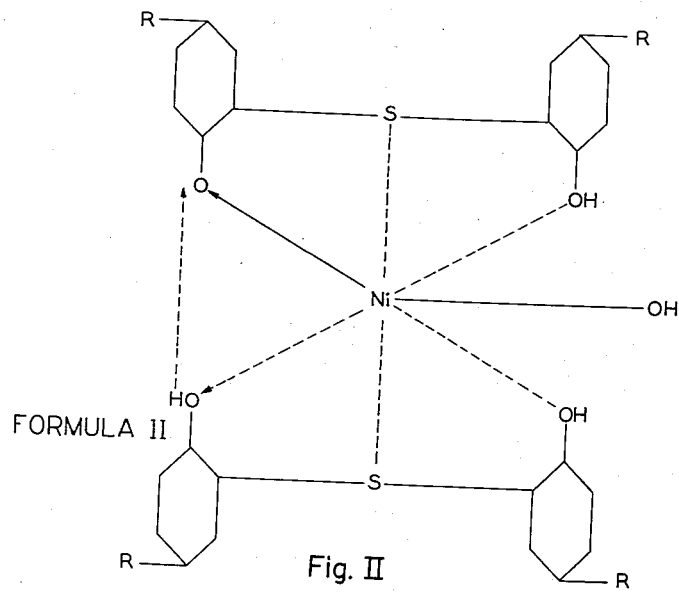
FORMULA II
Fig. II
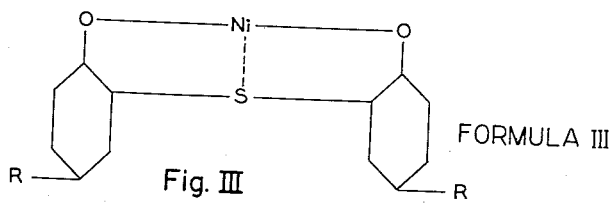
FORMULA III
Fig. III

United States Patent Office 2,971,941
Patented Feb. 14, 1961

NICKEL BIS-(p-OCTYLPHENOL) MONOSULPHIDE STABILIZED POLYETHYLENE

Charles H. Fuchsman, Cleveland Heights, Albright M. Nicholson, Warrensville Heights, and Stanley B. Elliott, Bedford, Ohio, assignors to Ferro Corporation, Cleveland, Ohio, a corporation of Ohio Filed May 15, 1959, Ser. No. 813,459

4 Claims. (Cl. 260—45.75)

This invention relates to stabilized polyethylene compositions, and more particularly to polyethylenes which have been stabilized with certain nickel phenolates hereinafter more particularly described.

The inertness of polyethylene under a variety of conditions has resulted in increasingly widespread use in diverse fields of application. One of the factors which limits present usefulness in outdoor application is the tendency to deteriorate under the influence of ultraviolet light present in sunlight. This deterioration is detectable in a number of ways, chief of which are an increase in brittleness and a decrease in elongation under tensile stress. These changes in the original characteristics of the polyethylene cause sheets or fibers of such materials when exposed to weather to break and tear readily. Utilization of polyethylene in sheet or fiber form, in covering greenhouses, draping open areas in building construction, etc. is consequently much reduced.

Attempts have been made to use various additives for the prevention of ultraviolet light deterioration of polyethylene. Thus, the addition of carbon black alone or with antioxidants reduces light deterioration. However, the resulting product is opaque to visible light and thus of limited utility. Other attempts to meet this problem have included admixture of various commercially available ultraviolet absorbers with the polyethylene. Some substituted benzophenones which are excellent ultraviolet light absorbers are very difficult to retain in admixture with polyethylene. These materials have, however, conferred insufficient light stability, or have proved largely incompatible with polyethylene, and have migrated to the surface of the plastic where they are readily removed by rain and wind-borne abrasive dusts. Any unremoved efflorescence is unsightly and opaque.

It is a principal object of this invention, therefore, to provide improved polyethylene compositions better able to withstand the deleterious effects of prolonged exposure to ultraviolet light sources.

Other objects of the invention will appear as the description proceeds.

In the accompanying drawing,

Figure I represents Formula I;
Figure II represents Formula II;
Figure III represents Formula III.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that nickel bis-(p-octylphenol) monosulphide compounds in which only a portion of the phenolic hydrogen atoms has been replaced by nickel, possess important light stabilization characteristics when used as additives in polyethylene. Briefly stated, therefore, this invention comprises polyethylene containing in intimate admixture therewith from about 0.05% to about 5% by weight of the nickel phenol-phenolate of a bis-(p-octylphenol) monosulphide.

The term "stabilized" and the various forms of the word used herein, has reference to improvement in the ability of the treated material upon prolonged exposure to the destructive force of ultraviolet light to retain certain of its original characteristics. Thus, in the present case, there is an improvement in the ability of polyethylene compositions upon prolonged exposure to the destructive forces of ultraviolet light to retain flexibility and stretchability (elongation) in useful degrees. In the absence of the stabilizers of this invention, polyethylene, linear and branched, upon exposure to ultraviolet light, such as present in sunlight, rapidly becomes brittle and sheets thereof break or tear readily.

The polyethylenes improved in accordance herewith are of the branched, or the linear types. Ziegler process polyethylene is produced in accordance with Belgium Patent No. 533,362. Philipps process polyethylene (linear) is produced in accordance with Belgium Patent No. 530,617. Reference may also be had to the patent to Larchar, 2,816,883, for a specific product and process for polymerizing ethylene.

One of the primary advantages of the nickel phenol-phenolates of the present invention is that in the minor amount effective to stabilize the polyethylene, i.e., from about 0.05% to about 5% by weight, the coloration imparted by the additive is not objectionable. Thus in application, such as the covering of greenhouses and structural openings, the normal light translucence of the plastic material is not greatly altered by the inclusion of these materials.

The improved stabilized compositions of the present invention are best made from a polyethylene composition to which has been added by conventional procedures, a nickel phenol-phenolate prepared from a crystalline o,o'-bis-(p-octylphenol) monosulphide. Of particular utility to this respect is the nickel phenol-phenolate of crystalline o,o'-bis-(p-1,1,3,3-tetramethylbutylphenol) monosulphide.

A method of preparing a bis-(p-octylphenol) monosulphide of good quality is illustrated by the preparation of crystalline o,o'-bis-(p-1,1,3,3-tetramethylbutylphenol) monosulphide. In the course of the preparation of this material various polymeric by-products are often formed simultaneously with the desired bis-(p-octylphenol) monosulphide. Since the nickel derivative of such polymeric material tends to be objectionably dark, even at 50% displacement of H atoms by Ni, it is usually necessary to effect a separation between the by-product polymer sulphide and the bis-(p-octylphenol) monosulphide prior to the production of the nickel salt. The example given below and those given in co-pending application of A. M. Nicholson et al., Serial No. 789,908, filed January 29, 1959, illustrate such a separation based on differential solubility between the product and the by-products in a commercially available mixture of aliphatic hydrocarbons.

EXAMPLE I

A solution of p-1,1,3,3-tetramethylbutylphenol (200 gms.) in carbon tetrachloride (640 gms.) is prepared at room temperature and then cooled to 45° F. with strong agitation. At this temperature, the p-1,1,3,3-tetramethylbutylphenol tends to come out of solution, but this is of little concern so long as the mixture is kept under agitation. 50 grams of $SCl_2$ admixed and in solution with 50 grams of $CCl_4$ are added over a period of about one hour, and the mixture allowed to agitate for an hour after the addition has ceased. After overnight standing, the mixture is washed with water to extract HCl, cooled and diluted with 200 grams of petroleum ether (B.P. 30°–60° C.). The more highly sulphurized product is soluble in the petroleum ether. However, the o,o′-bis-(p-1,1,3,3-tetramethylbutylphenol) monosulphide separates out as a crystalline white solid which is easily filtered. This is an example of an o,o′-bis-(p-octylphenol) monosulphide.

Alternatively, high vacuum distillation may be employed to separate out desired bis-(p-octylphenol) monosulphide from reaction masses.

The nickel salts of the monosulphide may be prepared by two basically different methods: metathesis and direct reaction.

EXAMPLE II

The procedure involving a metathetic reaction is as follows: The sodium phenol-phenolate of the o,o′-bis-(p-1,1,3,3-tetramethylbutylphenol) monosulphide of Example I above is produced by reaction thereof with one-half the stoichiometric amount of sodium ethoxide dissolved in absolute ethanol (20% solution) required to react with all the phenolic hydroxyl. This reaction is followed by reaction with a quantity of NiCl$_2$ in solution in absolute ethanol sufficient to replace all of the sodium in the sodium phenol-phenolate. Sodium chloride is precipitated and filtered off. On evaporation of the alcohol, a light green crystalline product having a nickel content of 5.5% found, as against a theoretical percentage of 6.2% is obtained. The deficiency in nickel is attributed to the presence of unreacted bis-(p-octylphenol) monosulphide.

EXAMPLE III

To produce a nickel phenol-phenolate particularly useful in accordance with this invention, a quantity of nickel acetate tetrahydrate dissolved in xylene (1:1) and equivalent to half the number of phenolic OH groups in the sulphurized phenol, is heated with a 40% solution of o,o′-bis-(p-1,1,3,3-tetramethylbutylphenol) monosulphide in xylene at or slightly below the boiling point of acetic acid. With continued heating, the latter is distilled off almost quantitatively. The xylene solution is filtered to remove any xylene-insoluble impurities which may have formed during the reaction. The filtrate is evaporated to remove all the xylene. The residual liquid may be cooled by any of several procedures to yield the solid product. The product is hard and friable and contains 6.1% Ni (theoretical 6.1% Ni).

The following examples demonstrate and illustrate the utilization of the stabilizers of the present invention, it being understood that these examples are for illustrative purposes only.

A series of samples of polyethylene were compounded on a steam heated 2-roll mill of conventional commercial design following the conventional practice for incorporating stabilizers and other ingredients into the polymer. The milled sheet was then ground into a coarse, sandy consistency and fed to an electrically heated film extruder. The temperature of milling and extrusion varied from batch to batch of polyethylene depending principally on the melt index and on the molecular character of the polyethylene that is, whether it was linear or branched. The film was extruded at an average thickness of 5.0 mils and tested for tensile strength and elongation. Samples were then exposed for varying periods of time to intense ultraviolet light in an Atlas X–1–A weatherometer and the tensile strength and elongation measured periodically. The weatherometer may be operated with or without the use of water sprays to simulate accelerated moist weathering. In the cases cited here, the water sprays were not used, thereby simulating and accelerating the effect of hot, dry weathering, a much more severe condition.

Table 1

Comparison of performance of nickel phenol-phenolate produced in accordance with Example III, with metal-free o,o′-bis-(p-1,1,3,3-tetramethylbutylphenol) monosulphide at 1% concentration by weight in Ziegler process polyethylene after indicated exposure to ultraviolet light in the Atlas weatherometer.

| Percent Ni in Additive | Color of Extruded Film | Percent Elongation | |
|---|---|---|---|
| | | 0 Hours | 150 Hours |
| Control | White | 640 | 10 |
| 0.0 | do | 530 | 40 |
| 6.1 | Lt. Green | 550 | 310 |
| 6.1 | do | 500 | 530 |
| 6.2 | do | 690 | 360 |
| 6.2 | do | 740 | 370 |
| 6.2 | do | 750 | 345 |

When samples were prepared containing Ni concentrations appreciably higher than 6.2% in the additive, i.e., samples in which the full nickel phenolate (Formula III in the annexed drawing) was present in significant concentration, the colors of the films so prepared were much darker, and tended also to be characterized by a green-brown to gray-brown cast.

A nickel phenol-phenolate produced in accordance with Example II and which is believed to have a formula such as given in the drawing and identified as Formula I, performs in substantially the same manner as that produced by the procedure of Example III, Formula II in the annexed drawing, in stabilizing polyethylene against the deleterious effects of ultraviolet light. "R" in the formulas in the annexed drawing is an octyl group, e.g., 1,1,3,3-tetramethylbutyl.

Parallel results have also been obtained in films based on linear polyethylene produced by the Philipps process. In general, the stabilizers of the present invention are effective over a much broader range of concentration, namely 0.05% to about 5%. At the lower limit in this broad range, the material just begins to show effectiveness for the purposes of this invention. The product is very light colored. While there appears to be continued improvement at concentrations above 1%, that is up to 5% by weight and intermediate quantities, after amounts of about 1% by weight have been added to the polyethylene, the amount of improvement in flexibility and elongation after 150 hours' exposure to intense ultraviolet light does not appear to justify the added cost of the stabilizer.

Commercial samples of branched (high pressure, low density) polyethylene prepared by a process analogous to that of British Patent No. 471,590, were compounded and tested in the manner of the sample given in Table I above using an additive produced in accordance with Example III and containing 6.1% Ni. The control samples with no additive had an elongation of 45% after 250 hours. Samples containing 0.2% of the additive averaged 80% elongation, and samples containing 1.0% additive averaged 100% elongation.

It is of fundamental importance that the purity of the bis-(p-octylphenol) monosulphide used in the manufacture of the light stabilizing additive of this invention be assured. The sulphide, as prepared, is heavily contaminated with dark viscous polysulphides. Unless these polymeric materials are removed, the nickel derivatives are invariably an unsightly gray-brown when incorporated in polyethylene. Since transmission of visible light and very light color are of great commercial importance in polyethylene sheet and fiber, a method of separating the bis-(p-octylphenol) monosulphide from its polymer is critical. An unusual and favorable property of this monosulphide, and one wherein it differs from other alkylphenol monosulphides, is that it can be crystallized out of hydrocarbon solutions of the polymer, and that it is sufficiently insoluble to permit repeated washing or repulping of the crystals. Thus, its uniqueness in crystallization behavior, coupled with its ability to form compounds in which only part of the phenolic hydrogens are replaced by nickel as shown in Formulas I and II in the annexed drawings, has contributed to the formation of a new, effective, and commercially useful light stabilized polyethylene.

Thus, there has been provided a stabilized polyethylene composition which is by virtue of the intimate admixture therewith of from about 0.05% to about 5% by weight of the nickel phenol-phenolate of a bis-(p-octylphenol) monosulphide able to withstand exposure to the deleterious effects of ultraviolet light for prolonged periods without becoming unduly brittle and inflexible. A further advantage of these compositions is that the degree of coloration added to the polymer by the amount of the stabilizers indicated as useful is such as to preserve much of the translucency and light color of the polymer. Of course, other ingredients may be added to the compositions of the present invention, such as, for example, antioxidants of the type used for heat stabilization, pigments, plasticizers, fillers, additional stabilizers against light, etc., without substantially altering the manner in which the compositions of this invention operate. While we are not certain of the phenomenon occurring by virtue of the inclusion of the nickel compounds herein described, it is believed that embrittlement and loss of flexibility in the untreated polyethylene are the results of cross-linking and increase in molecular weight of the polymer under the influence of ultraviolet light, whether from an artificial or natural source. The nickel phenol-phenolate materials herein described appear to have the ability to prevent cross-linking in the polymer.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. Polyethylene containing in intimate admixture therewith from about 0.05% to about 5% by weight of a nickel phenol-phenolate of a crystallizable o,o'-bis-(p-octylphenol) monosulphide containing no more than 6.2% nickel, and which coacts in said polyethylene to preserve elongation and flexibility after prolonged exposure to ultraviolet light.

2. Light colored polyethylene containing in intimate admixture therewith about 1% by weight of the nickel phenol-phenolate of crystallizable o,o'-bis-(p-1,1,3,3-tetramethylbutylphenol) monosulphide containing no more than 6.2% nickel, and which coacts in said polyethylene to preserve elongation and flexibility after prolonged exposure to ultraviolet light.

3. Light colored polyethylene containing in intimate admixture therewith from about 0.05% to about 5% by weight of the nickel phenol-phenolate of crystallizable o,o'-bis-(p-1,1,3,3-tetramethylbutylphenol) monosulphide containing no more than 6.2% nickel, and which coacts in said polyethylene to preserve elongation and flexibility after prolonged exposure to ultraviolet light.

4. The method of preserving the elongation and flexibility of polyethylene after prolonged exposure to actinic light which comprises intimately admixing therewith from about 0.05% to about 5% by weight of the nickel phenolphenolate of a crystallizable o,o'-bis-(p-octylphenol) monosulphide containing no more than 6.2% nickel.

References Cited in the file of this patent

UNITED STATES PATENTS

| | | |
|---|---|---|
| 2,310,449 | Lightbown et al. | Feb. 9, 1943 |
| 2,380,299 | Evans et al. | July 10, 1945 |
| 2,449,026 | Van Gilder | Sept. 7, 1948 |
| 2,461,335 | Mikeska | Feb. 8, 1949 |
| 2,493,986 | McNab et al. | Jan. 10, 1950 |